March 23, 1948.   H. J. SEAMAN   2,438,189
ROTARY GROUND-WORKING IMPLEMENT
Filed Dec. 4, 1944   4 Sheets-Sheet 1

INVENTOR
HARRY J. SEAMAN
BY Christopher L. Waal
ATTORNEY

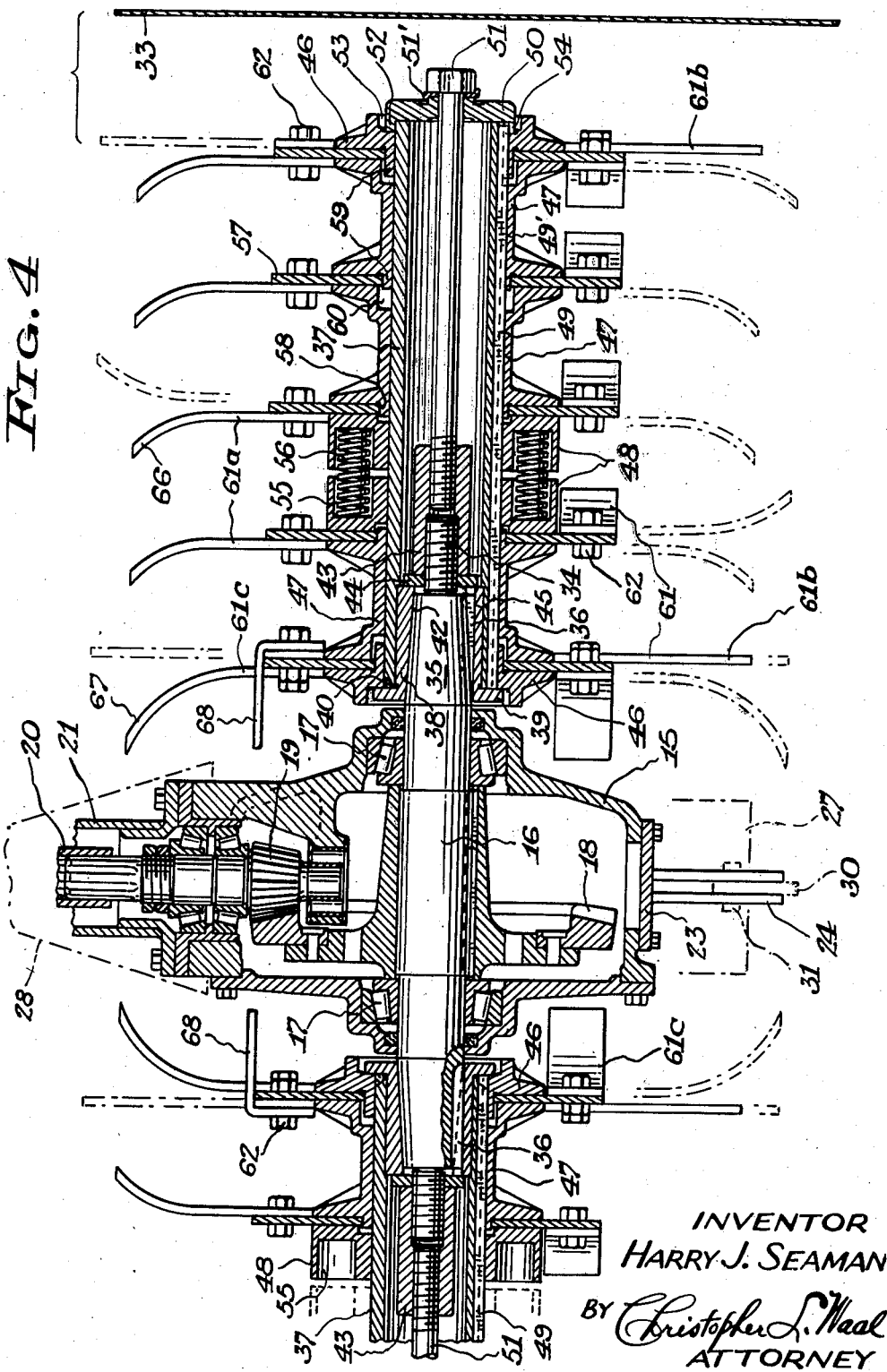

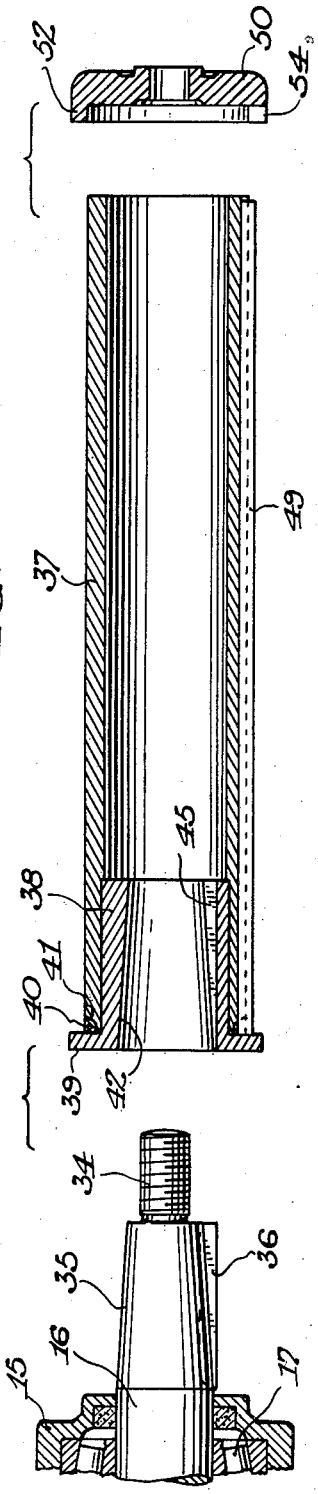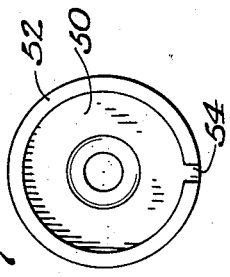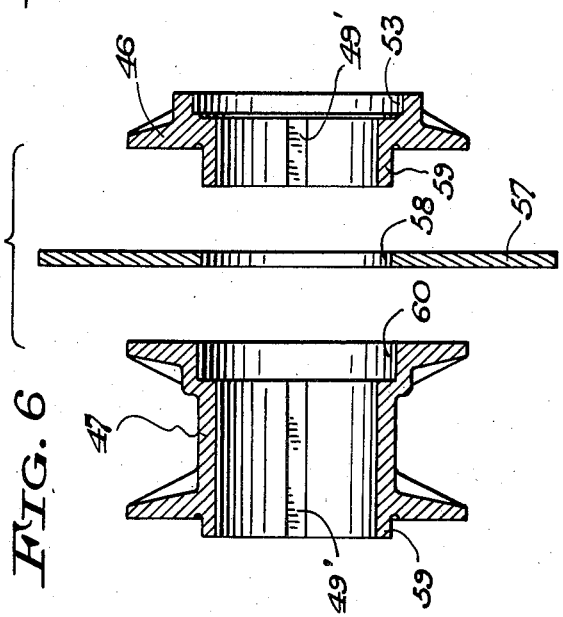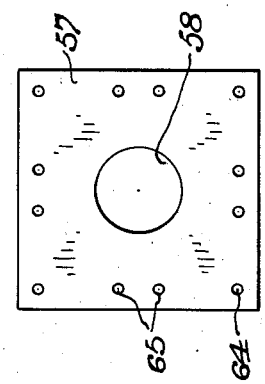

March 23, 1948.  H. J. SEAMAN  2,438,189
ROTARY GROUND-WORKING IMPLEMENT
Filed Dec. 4, 1944  4 Sheets-Sheet 4
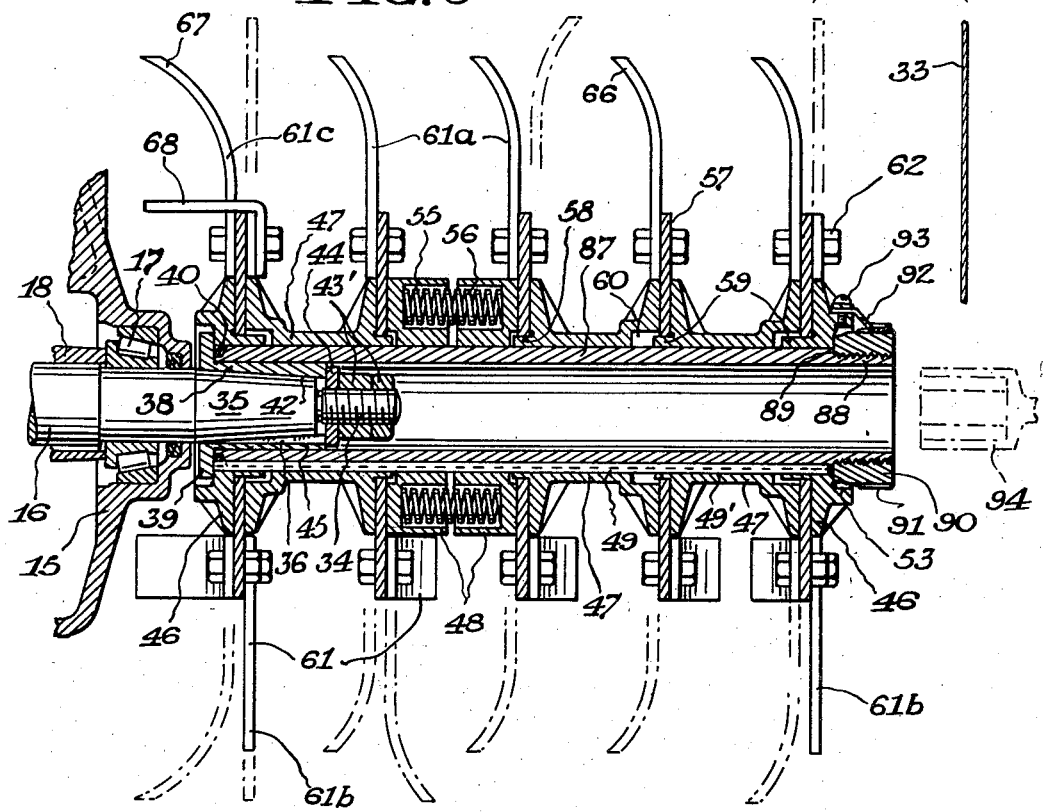
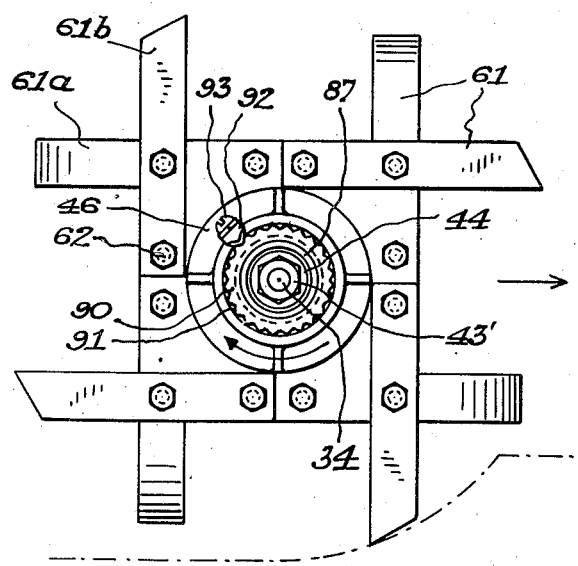
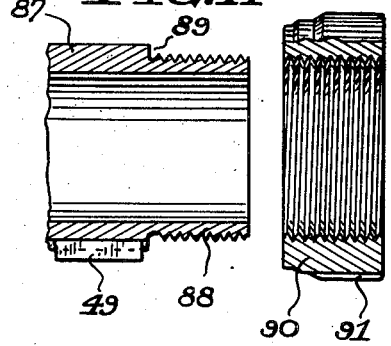
INVENTOR
HARRY J. SEAMAN
BY Christopher L. Waal
ATTORNEY Patented Mar. 23, 1948

2,438,189

UNITED STATES PATENT OFFICE 2,438,189

ROTARY GROUNDWORKING IMPLEMENT

Harry J. Seaman, Milwaukee, Wis.

Application December 4, 1944, Serial No. 566,407

10 Claims. (Cl. 97—212)

1

The present invention relates to rotary implements adapted for digging, pulverizing, mixing, and otherwise working various materials, as in soil cultivation and road building.

An object of the invention is to provide a rotary implement having improved shaft means of simple, durable, and rugged construction permitting interchangeable mounting of various forms of ground-working tools and tool-carrying shaft members.

Another object of the invention is to provide a power-driven implement permitting slippage of the tools under excessive load, and including an improved arrangement of friction clutch means on a tubular shaft member.

A further object is to provide an implement having a tool-carrying shaft member which forms a unitary assembly adapted to be detachably secured to a driving shaft.

The invention further consists in the several features hereinafter described and claimed.

In the accompanying drawings,

Fig. 4 is a longitudinal sectional view taken generally along the line 4—4 of Fig. 1;

Fig. 5 is a longitudinal sectional elevation of a tubular implement shaft and associated parts;

Fig. 6 is a sectional elevation of a tool mounting plate and associated clamping or clutching member for the plate;

Fig. 7 is a detail view of a clamping member for the outer end of the shaft;

Fig. 8 is a detail view of a tool mounting plate;

Fig. 9 is a longitudinal sectional view of a modified form of implement;

Fig. 10 is an end view of the implement of Fig. 9, and

Fig. 11 is a detail sectional view of parts of the implement shaft of Fig. 9.

Figure 1:
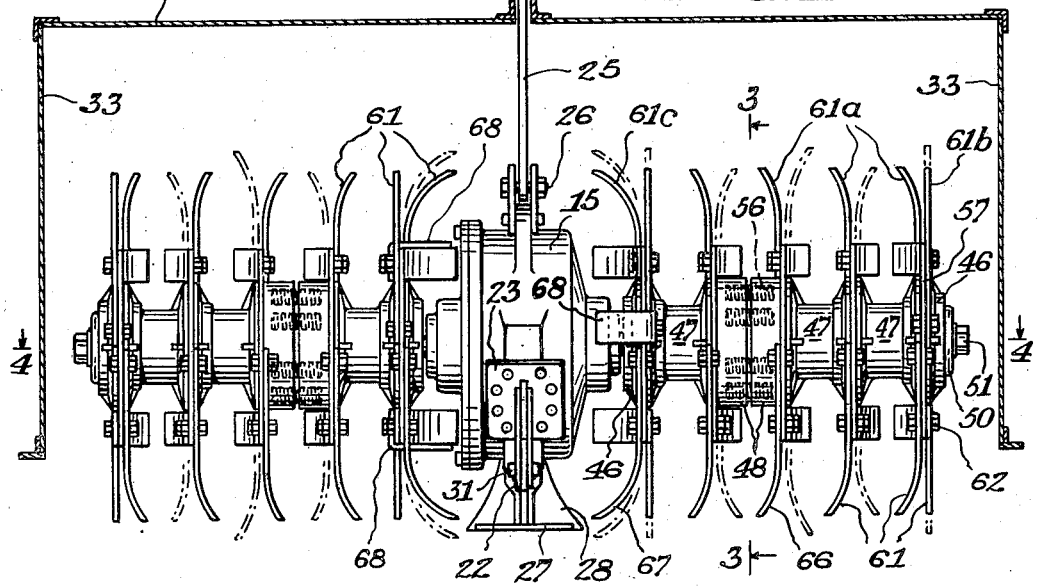
Fig. 1 is a rear elevation of a rotary pulverizing implement constructed in accordance with the invention, a hood for the implement being shown in section.

In these drawings, the numeral 15 designates a drive housing which has journalled therein the intermediate portion of a transversely extending horizontal shaft member 16, as by roller bearings 17. The shaft member 16 has keyed thereto a bevel gear 18 which meshes with a bevel pinion 19 on a forwardly projecting drive shaft 20 journalled in the housing, the drive shaft extending

Figure 2:
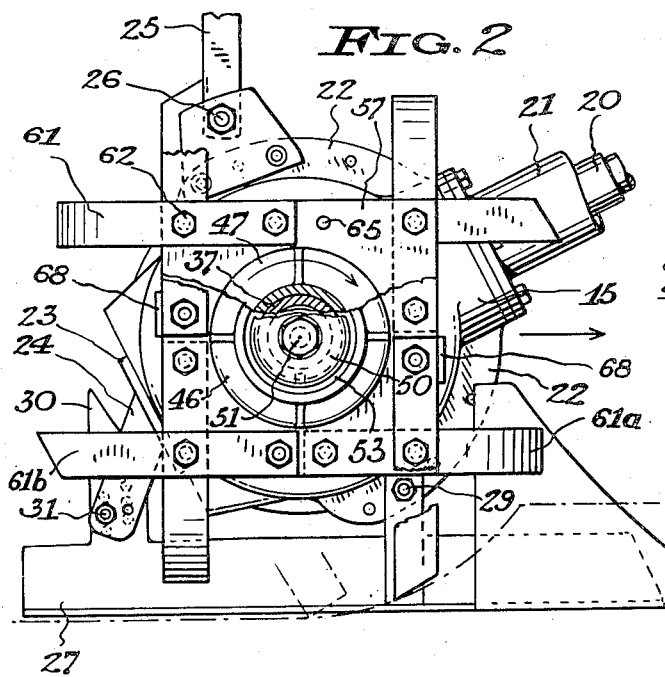
Fig. 2 is an end elevation of the implement, parts being broken away and parts being shown in section.
Figure 3:
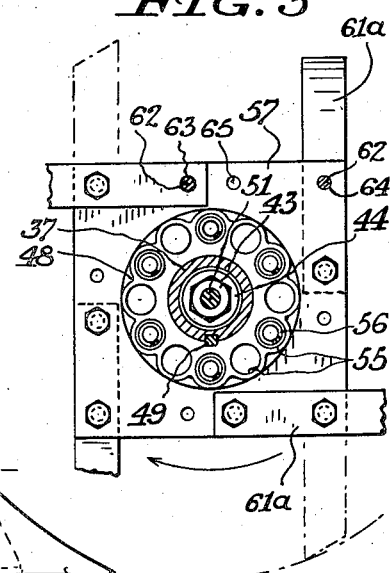
Fig. 3 is a sectional elevation taken generally along the line 3—3 of Fig. 1.

2 in a torque tube 21 rigidly secured to the housing. The housing is invertible to suit the direction of rotation of the drive shaft 20, and is provided with apertured upper and lower flanges 22 for attachment of parts hereinafter described. The rear end of the housing is closed by a detachable cover plate 23 which carries a pair of laterally spaced rearwardly and downwardly projecting bracket arms 24. The housing is suitably supported at an adjustable elevation, as by a suspension bar 25 which has a detachable pivotal connection 26 with the upper housing flange 22. In some instances, the housing carries therebelow a depth shoe 27 having a plow 28, Fig. 2, at its front end, the depth shoe having a detachable pivotal connection 29 with the lower housing flange 22. An apertured vertical tongue 30 at the rear portion of the shoe extends between the housing bracket arms 24 and is secured thereto at an adjustable eelvation with respect to the housing by a bolt 31 to adjust the cutting depth. A suitably supported hood 32 extends over the drive housing and has opposite parallel side walls 33.

The shaft member 16 has stub ends which project from opposite side walls of the drive housing, each stub end comprising a screw-threaded terminal stem 34 and a tapered portion 35, the latter having a key 36. Tubular extension shaft members 37 are rigidly but detachably secured to the ends of the shaft member 16 and each comprises a length of metal pipe or tubing into the inner end of which is pressed a bushing 38 having an outwardly projecting annular flange 39. The tubular shaft member is rigidly joined to the bushing flange by a weld 40 formed in a rabbet 41 in the end of the shaft member adjacent to the flange. The bushing has a tapered coaxial bore 42 in which the corresponding tapered portion 35 of the shaft member 16 is firmly seated by means of an elongated nut 43 engaging the stem 34, the nut abutting against a washer 44 which is interposed between the nut and the adjacent end of the bushing 38, and the key 36 fitting in a keyway 45 formed in the housing. The short shaft member 16 is preferably formed of heat-treated steel, while the detachable extension shaft members 37, which are of various lengths for machines of different capacity, may be formed of less expensive steel. The three connected shaft members form a tool shaft, the opposite ends of which lie adjacent to the side walls 33 of the hood 32.

Each tubular shaft member 37 has mounted thereon a series of clamping or friction clutch members 46, 47 and 48, which are slidable axially on the shaft member but are held against relative rotation with respect to the shaft member, as by a spline key 49 fitting in keyways 49' in the clutch members. The clutch members 46 are in the form of a pair of flanged end collars, the collar adjacent to the drive housing abutting against the annular bushing flange 39 at the end of the shaft member, and the collar adjacent to the free end of the tubular shaft member being confined by a centrally apertured cap-shaped end member or retaining member 50 which is clamped to the end of the shaft member by a headed bolt 51 extending axially in the shaft member and screwed into the nut 43. The head of the bolt 51 is confined against rotation from clamping position by a bendable lock washer 51'. The end member 50 has a peripheral annular clamping flange 52 which fits about the end of the tubular shaft member and which extends in a counterbore or recess 53 of the adjacent end collar 46. The flange 52 has a notch or recess 54 receiving the outer end of the key 49 to prevent relative rotation of the end member and the tubular shaft member. The clutch members 47 are in the form of radially ribbed spool-shaped spacers, three being shown in the present instance. The clutch members 48 are in the form of a pair of opposed spring casings provided thereabout with a plurality of pairs of aligned cylindrical spring pockets 55 extending parallel to the shaft axis. Compressed coiled springs 56 are confined in some or all of the opposed pockets 55 and urge the casings apart, the number of springs being varied to obtain the desired spring pressure. It is usually desirable to place the spring casings 48 at an intermediate point in the series of clutch members, so as to distribute accumulated wear and to equalize the spring pressure along the tubular shaft member irrespective of friction between the clutch members and the shaft member, and to avoid excessive weight at the free end of the shaft. Flat tool mounting plates 57 are interposed and engaged between the clutch members of the shaft and extend at right angles to the axis of the shaft. By way of example, five mounting plates are provided at each side of the drive housing 15, although more may be used in machines of higher capacity. Each tool mounting plate, which is of steel or other suitable metal, is preferably square in shape and has a central circular opening 58. The plate rotatably fits on a centering boss or nipple 59 formed on one of the adjacent clutch members, the companion clutch member being provided with a recess or counterbore 60 to provide clearance for the end of the nipple. The opposite flat faces of each tool mounting plate frictionally engage the flat end faces of the adjacent flanking clutch members under the pressure of the compressed coiled springs 56, so as to permit slipping of the plate under abnormal working conditions, as hereinafter described.

Each tool mounting plate 57 detachably carries thereon a number of angularly spaced groundworking tools or tines designated generally by the numeral 61 and here shown to be of three types, 61a, 61b, and 61c. Each tool is formed from a length of flat bar stock, preferably of resilient steel, and has an inner end portion abutting flatwise against a face of the associated mounting plate adjacent and parallel to an edge of the plate. The tool is secured to the plate by a pair of bolts 62 which pass through openings 63 in the tool and openings 64 and 65 in the plate. The openings 64 are located at the corner portions of the plate, and the openings 65 are located intermediate the corner openings.

Each of the three intermediate mounting plates is here shown to carry four of the tools 61a, each of which has a laterally bent or curved outer portion 66 forming a cutting lip, the tools projecting alternately on opposite sides of the plane of the plate, and the anchored portion of each tool being angularly in advance of the cutting lip.

Each outermost mounting plate is here shown to carry four of the tools 61a with their curved ends projecting toward the drive housing, and four of the tools 61b which are substantially straight, these latter tools projecting from the corner portions of the plate, and their cutting tips being angularly in advance of their anchored portions.

Each innermost mounting plate is here shown to carry four of the straight tools 61b and four of the tools 61c, the latter having curved outer ends 67 which project toward the drive housing, the path of these tool ends being such as to break up the soil under the housing. The curved tool ends 67 have a greater lateral projection than the tool ends 66.

The openings 64 and 65 in each mounting plate are so arranged as to permit the plate to be used on either of the extension shafts and to permit the tools to be mounted in various ways. The two attaching bolts 62 for each tool are spaced a considerable distance apart, thus avoiding excessively high stresses on these bolts. The attaching bolts are readily removed when it is desired to replace the tools.

In the operation of the implement, the tool shaft is driven at a suitable rate of speed, usually several hundred revolutions per minute, from a convenient source of power, such as an internal combustion engine, not shown. The entire implement is moved slowly over the ground to be worked, in the direction indicated by the straight horizontal arrow in Fig. 2, the direction of rotation of the tool shaft being such as to assist the forward movement of the implement. During their rotation, the tools 61 dig into the ground or other material being worked and have a cutting, pulverizing, and mixing action on the material. If any of the tools strike stones, roots, or other obstructions in the soil, the associated mounting plate 37 will slip momentarily with respect to the flanking clutch members and thus avoid damage to the mechanism. However, the other tool mounting plates will continue to turn. The resilient tools are capable of yielding sideways when striking obstructions, thus minimizing damage to the tools. The tools rotate edgewise, thereby facilitating penetration and groundworking action and providing strength and durability.

The tubular extension shaft members 37 are firmly carried on the shaft member 16, but are readily detachable therefrom so as to permit the substitution of other extension shaft members of different lengths or of different construction for other types of tools. The tubular shaft members are strong and rigid without having excessive weight and without being excessively large in diameter, thus avoiding unduly large friction clamping members. The inside diameter of each tubular shaft member need be only sufficiently large to admit a socket wrench (not shown) for tightening and loosening the nut 43.

When the implement is used in agriculture it is often desirable to provide several sets of different tools to meet various tilling conditions. These tools may be carried on different sets of tool mounting plates, or they may be separate from the mounting plates. The tools and mounting plates can be quickly changed in the field.

The modified form of implement shown in Figs. 9 to 11 includes tubular extension shaft members 87, one being shown, each of which has a reduced screw-threaded free end 88 with an annular shoulder 89, the shaft members 87 being otherwise of the same construction as the shaft members 37. The shaft member 87 carries clamping members 46, 47, and 48, and associated tool mounting plates 57, as in the implement of Fig. 1, the members 48 being urged apart by coil springs 56. A retaining nut 90 is carried on the shaft end 88 and abuts against the shaft shoulder 89 and also against the adjacent end clamping member 46 to place and retain the several tool mounting plates under spring pressure. The nut 90 has a band of serrations 91 about its periphery for engagement with a turning tool, and is held in clamping position by a detent spring 92 selectively engageable in the serrations and secured to the end clamping member 46, as by a screw 93. The stub ends of the shaft member 16 are rigidly secured to the tubular extension shaft members 87 by nuts 43' which are applied and detached as by means of a socket wrench 94 insertible into the open-ended tubular shaft member.

Each tubular shaft member 77, together with the tool mounting plates and other parts carried thereon, forms a rotor unit which can be secured to and detached from the shaft member 16 without disturbing the clamping relation of the tool mounting plates. This permits a number of complete rotor units, which may be provided with different types of tools, to be selectively applied to the shaft member 16. The use of complete rotor units also facilitates changing of tools and reduces the possibility of error in assembling the several parts. The operation of the implement of Figs. 9 to 11 is the same as that of Fig. 1.

Under certain conditions, there is a tendency for mud or grass, or both, to accumulate on the drive housing of each form of implement and to occupy the spaces between the sides of the housing and the adjacent tool mounting plates. In order to keep these spaces reasonably clear, each of the innermost tool mounting plates 57 is equipped with tools or cutters 68 which project toward the drive housing and have their free ends adjacent to the opposite side walls of the drive housing, the cutting radius of these tools being considerably shorter than the cutting radius of the tools 61c. Each tool 68 is here shown to be in the form of an angle member of flat metal bar stock, one leg of which is bolted to the plate and the other leg of which extends toward the drive housing approximately parallel to the axis of the tool shaft, the latter leg presenting a leading edge which serves to cut away any mud or grass in its path. The radius from the shaft axis to the leading edge of the tool 68 is greater than the radius from the shaft axis to the trailing edge of the tool. Each innermost tool mounting plate is here shown to carry two of the tools 68 at diametrically opposite regions, but, if desired, more of the tools 68 may be provided. The tools 68 also have a pulverizing and mixing action, especially in the case of deep tilling.

What I claim as new and desire to secure by Letters Patent is:

1. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, and friction clutch means on said tubular shaft member for drivingly connecting said tool-carrying means with said tubular shaft member.

2. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member.

3. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said retaining means including a rod extending within said tubular shaft member and engaging said screw-threaded member.

4. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said retaining means including a cap-shaped member fitting over the outer end of said tubular shaft member.

5. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said retaining means including a cap-shaped member fitting over the outer end of said tubular shaft member, said cap-shaped member having a recess, and said tubular shaft member having a key an end of which is disposed in said recess to prevent relative rotation of said cap-shaped member and tubular shaft member.

6. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said last-named end of the tubular shaft member being open to permit access to the screw-threaded member through the interior of the tubular shaft member.

7. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said retaining means comprising a screw-threaded member engaging said tubular shaft member and being centrally open to permit access to said first-named screw-threaded member through the interior of the tubular shaft member.

8. In a rotary implement, a rotatable tubular shaft member, a driving shaft member having an end portion rigidly mounted in an end portion of said tubular shaft member, a screw-threaded member disposed axially within said tubular shaft member and having a screw-threaded engagement with said driving shaft member for detachably securing said shaft members together, tool-carrying means on said tubular shaft member and relatively rotatable with respect thereto about the axis thereof, friction clutch means on said tubular shaft member for drivingly connecting said tool-carrying means with said tubular shaft member, and retaining means for said tool-carrying means and friction clutch means disposed at the end of said tubular shaft member distant from said driving shaft member, said retaining means comprising a screw-threaded member engaging said tubular shaft member and being centrally open to permit access to said first-named screw-threaded member through the interior of the tubular shaft member, and means engaging said retaining member for locking said screw-threaded retaining member on said tubular shaft member.

9. In a rotary implement, a rotatable tubular shaft member, a bushing rigidly secured in one end of said shaft member and having an outwardly projecting annular flange forming a stop, said bushing being adapted to receive a rotatable driving member therein, the end of said bushing within said tubular member forming an annular clamping shoulder, a plurality of friction clutch members mounted on said tubular shaft member against relative rotation, a plurality of tool-carrying members on said tubular shaft member and relatively rotatable with respect thereto about the axis thereof, spring means for exerting clutching pressure between said clutch members and tool-carrying members, and means at the end portion of said tubular shaft member distant from said bushing for detachably retaining said clutch members and tool-carrying members.

10. In a rotary implement, a rotatable tubular shaft member, a bushing rigidly secured in an end portion of said shaft member and having an outwardly projecting annular flange forming a stop, said bushing being adapted to receive a rotatable driving member therein, the end of said bushing within said tubular member forming an annular clamping shoulder, a plurality of tool means mounted in succession on said shaft, and retaining means at the end portion of said shaft distant from said bushing, said tool means being confined between said flange and said retaining means.

HARRY J. SEAMAN.

REFERENCES CITED

The following references are of record in the file of this patent:

UNITED STATES PATENTS

| Number | Name | Date |
|---|---|---|
| 1,114,839 | Wohlrab | Oct. 27, 1914 |
| 2,176,261 | Kelsey | Oct. 17, 1939 |

FOREIGN PATENTS

| Number | Country | Date |
|---|---|---|
| 194,113 | Switzerland | Feb. 1, 1938 |
| 276,828 | Germany | Oct. 5, 1927 |
| 310,294 | Italy | Aug. 8, 1933 |
| 354,589 | Great Britain | 1931 |
| 512,705 | France | Oct. 21, 1920 |